UNITED STATES PATENT OFFICE.

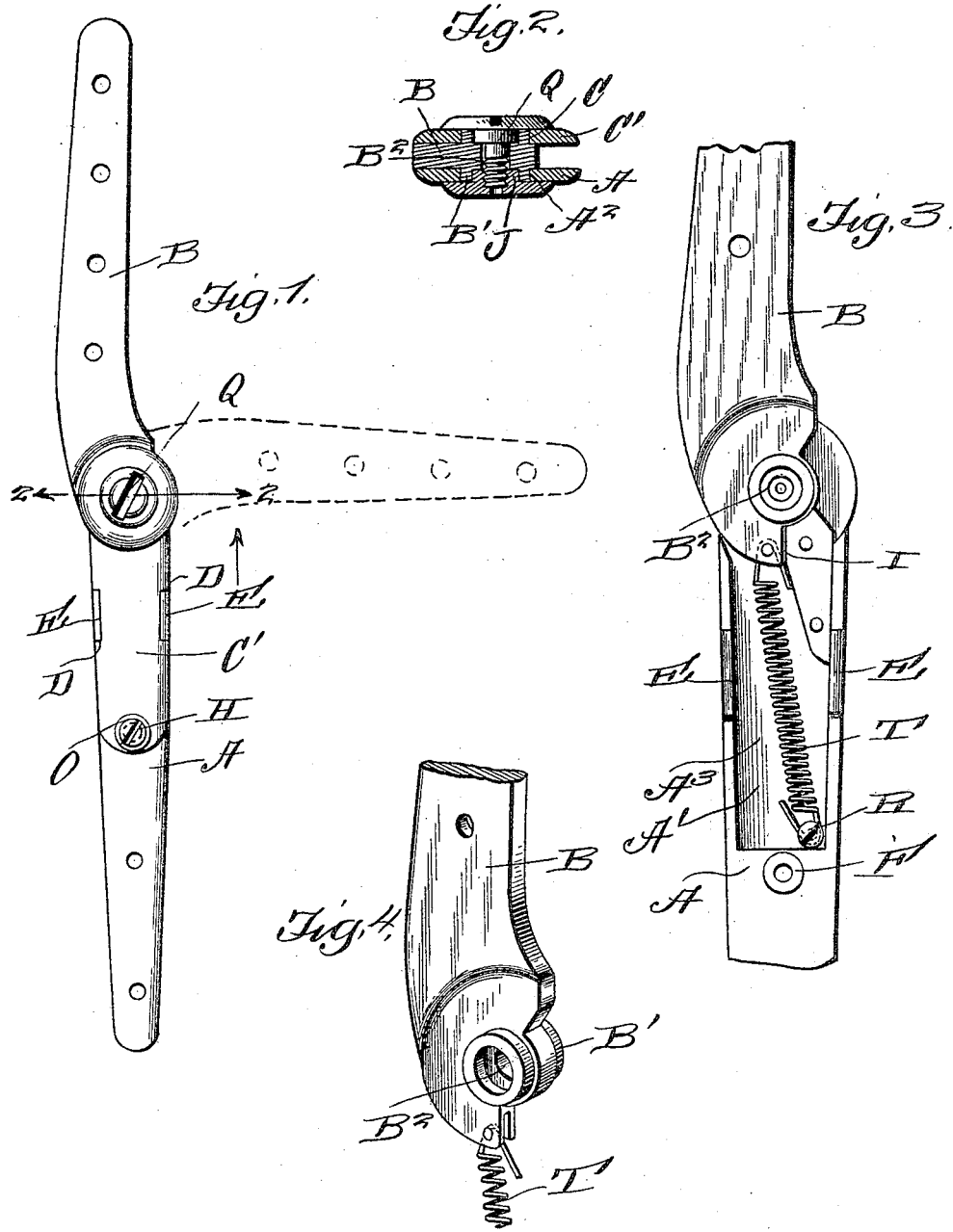

CHARLES E. KRITSCH, OF WASHINGTON, DISTRICT OF COLUMBIA.

JOINT FOR ARTIFICIAL LIMBS.

No. 817,785.　　　Specification of Letters Patent.　　Patented April 17, 1906.

Application filed February 23, 1906. Serial No. 302,546.

*To all whom it may concern:*

Be it known that I, CHARLES E. KRITSCH, a citizen of the United States, residing at Washington, District of Columbia, have invented certain new and useful Improvements in Joints for Artificial Limbs; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in flexible knee-joints for artificial legs, and comprises a simple and efficient means for connecting the sections of the limb by the employment of a few parts, dispensing with pawls and other devices which are apt to creak and rattle.

More specifically, the invention consists in the provision of two pivotal knee-joint members one of which is provided with a chambered portion the bottom of which, at one end thereof, is provided with an aperture adapted to receive a bushing upon the other member, the parts being held together by means of a screw passing through the bushing and engaging a nut upon the opposite end thereof, and in the provision of a coiled spring which is anchored at one end within said casing or chambered portion and its other end fastened to the pivotal member, thereby normally holding the two members in alinement with each other.

My invention consists, further, in various details of construction and combinations and arrangements of parts, which will be hereinafter fully described.

My invention is illustrated in the accompanying drawings, in which—

Figure 1 is a side elevation of the two joint members pivoted together, showing in dotted outlines the positions that one of the joints may assume. Fig. 2 is a cross-sectional view on line 2 2 of Fig. 1. Fig. 3 is a plan view with the plate or cover to the casing removed; and Fig. 4 is a detail view of one of the joint members detached, showing the bushing fixed thereto.

Reference now being had to the details of the drawings by letter, A and B designate two plates, the former of which is provided with a chambered portion A', the bottom wall of which extends beyond the flanges on the opposite sides thereof and is centrally apertured, as at $A^2$, for the reception of one end of the boss B', which projects about an aperture $B^2$, formed in one end of the member B. Said boss projects from either side of the member to which it is fixed, and one end of the boss has a bearing in the aperture in the member A, while the other end of the boss has a bearing in an aperture C, formed in the end of the cover C'. Said cover has two recessed portions D upon opposite edges thereof adapted to receive the ribs E, which project from the upper edges of the side walls of flanges of the recess formed in plate A. A boss F projects from one side of the plate A, adjacent to the rear end of the recess therein, and is adapted to engage an aperture H, formed in said cover. Said boss upon the plate A has a central threaded aperture adapted to receive a screw O, having a head which engages about the periphery of the opening in one end of said cover, while a screw Q is fitted within the central opening in the boss upon the plate B and is adapted to engage a threaded aperture in a socket J, inserted in one end of the boss. Mounted within said recess in the plate A is a spring T, one end of which is fastened to a screw R, while the opposite end of the spring is fastened to the end of the plate B and is adapted to normally hold the inner end of said plate B in contact with a stop I, fastened within the recess.

It will be noted that the outer edge of the pivotal end of the plate B is rounded and is flush with the edges of the cover and the projecting part of the plate A, to which it is pivoted, thereby affording a jointed plate without any projecting parts which are liable to catch upon clothing or other objects.

From the foregoing it will be noted that by the provision of a knee-joint as shown and described a simple and efficient means is afforded for connecting the two plates with a minimum number of parts, which is simple in construction, and so arranged that the swinging movements of the plates in opposite directions may be limited.

What I claim is—

1. A knee-joint for artificial legs, comprising two plates adapted for attachment to the sections of the leg, one of said plates having an aperture adjacent to one end, a hollow boss mounted in said aperture and to which the other plate has pivotal connection, a spring connecting the plates, and a stop carried by one of the plates and adapted to limit the throw of the plates in one direction, as set forth.

2. A knee-joint for artificial legs, comprising two plates, one of which has a hollow boss projecting from opposite faces thereof, the other plate being recessed with a projection at the end of said recess which is apertured to receive one end of the boss, a stop mounted in the recess and against which an end of the boss-carrying plate is adapted to contact, a spring mounted within said recess and connecting said plates, a closure for the recess, a screw passing through said boss, and a nut engaging said screw, as set forth.

In testimony whereof I hereunto affix my signature in the presence of two witnesses.

CHARLES E. KRITSCH.

Witnesses:
   A. L. HOUGH,
   FRANKLIN H. HOUGH.